(No Model.)
N. ENGELHART.
DIRT SCRAPER.
No. 356,755. Patented Feb. 1, 1887.
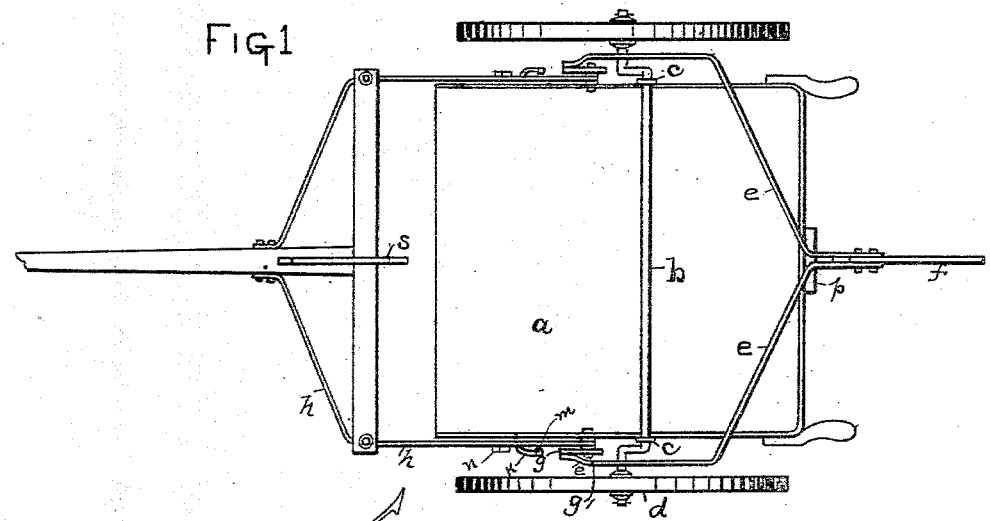
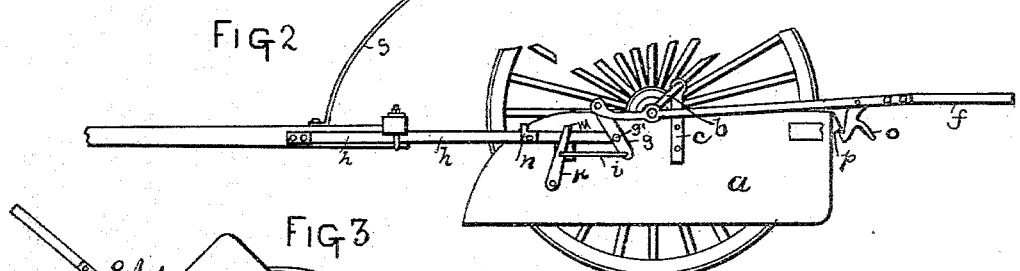
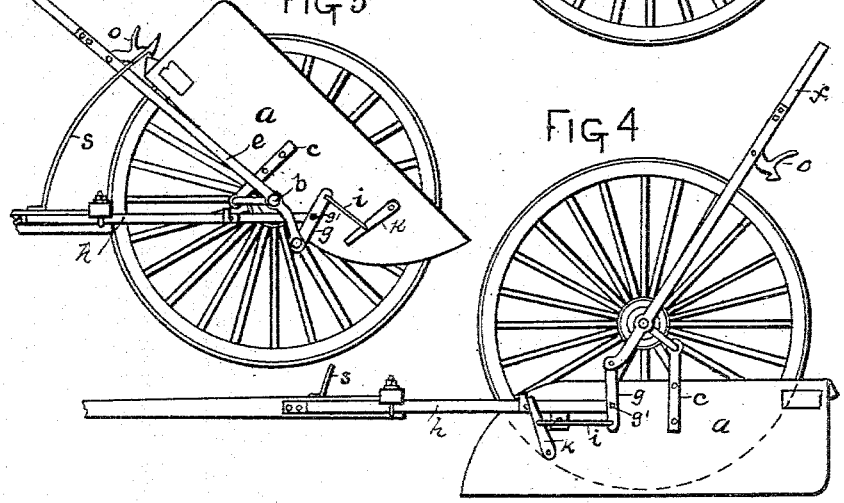
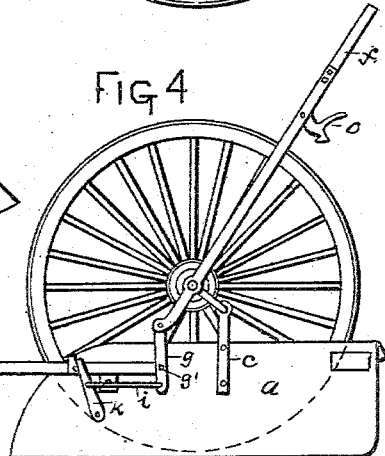
WITNESSES
L. F. Hayden.
M. L. Milligan.
INVENTOR
Nicholas Englehart
By his Attorney.
C. C. Shepherd.

UNITED STATES PATENT OFFICE.

NICHOLAS ENGELHART, OF COLUMBUS, OHIO.

DIRT-SCRAPER.

SPECIFICATION forming part of Letters Patent No. 356,755, dated February 1, 1887.

Application filed October 4, 1886. Serial No. 215,218. (No model.)

*To all whom it may concern:*

Be it known that I, NICHOLAS ENGELHART, a citizen of the United States, and a resident of Columbus, in the county of Franklin and State of Ohio, have invented a certain new and useful Improvement in Dirt-Scrapers, of which the following is a specification.

My invention relates more particularly to improvements in wheel dirt-scrapers, and the objects of my invention are, first, to provide simple and effective mechanism by means of which the bowl of a scraper may be raised, lowered, and dumped; second, to produce the same at a low cost of manufacture. These objects I accomplish in the manner illustrated in the accompanying drawings, in which—

Figure 1 is a plan view of a scraper having my improvement thereon. Fig. 2 is a side elevation with one wheel removed, showing the bowl raised in position for carrying dirt. Fig. 3 is a similar view showing the bowl when inverted for dumping. Fig. 4 is a side elevation, showing the bowl in a position for collecting dirt.

Similar letters refer to similar parts throughout the several views.

$a$ represents the bowl of the scraper, which is formed in the usual manner.

$b$ represents the shaft, which, extending transversely across the bowl a short distance above the top thereof, is made to bear loosely within the bearing-strips $c$, each of which is made to project upwardly from each side of the bowl $a$. That portion of each end of the shaft $b$ which projects through its bearing-strip $c$ is made crank-shaped, and has the wheel $d$ pivoted on its outer end. The diverging arms of the bail $e$ are provided with the usual rearwardly-extending handle, $f$, said arms extending, when the bowl is elevated for carrying dirt, diagonally forward and outward above the bowl, and thence forwardly in a line parallel to the sides of the bowl to points near the front end thereof. Each of the outwardly-projecting portions of the arms of the bail $e$ is provided with a hole, within which bears loosely the outwardly-projecting portion of the crank-shaped end of the shaft. The forward extremity of each of the arms of the bail is pivoted to the upper end of a short downwardly-projecting arm, $g$, said arm being pivoted near its central portion to the bowl by means of a bolt, $g'$, made to pass therethrough, said bolt also serving to pivot the rear end of the tongue-brace $h$ to the side of the bowl. To the lower end of the short arm $g$ is hooked a rod, $i$, the remaining end of which is hooked to the central portion of an arm, $k$, said arm $k$ being pivoted at its lower end to the side of the bowl, near the front end thereof, thence being bent outwardly and upwardly, and thence inwardly at its upper end to form a short lug, $m$.

Formed on the outer side of the tongue-brace $h$, near the point where it leaves the bowl, is formed a lug, $n$, the front portion of which is made to project upwardly. The front portions of the tongue-braces projecting forwardly are secured both to the tongue cross-piece and tongue.

Pivoted between the arms of the bail at a point in the rear of the bowl is the usual pendent catch-hook, $o$, which is adapted when the bowl is elevated to engage with the pocket or catch $p$, made to project from the rear side of the bowl, near the upper edge thereof.

When it is desired to drop the bowl in position to collect dirt, the hook $o$ is disengaged and the bowl is lowered, thus causing the bail to be elevated, and the lug $m$ of the arm $k$, through the arm $g$ and rod $i$, to bear against the upwardly-projecting portion of the lug $n$, which operates to prevent the bowl from overturning. When it is desired to invert the bowl, it may be raised by pressing downward upon the bail $e$, and causing its hook $o$ to engage with the catch $p$. By an upward pressure on the bail $e$ the bowl may be inverted, in which position it may be held by means of a hook formed on the upper end of a spring-strip, $s$, adapted to engage with the catch $p$. The lower end of said spring-strip is secured to the upper side of the tongue $t$.

I am aware that scrapers have been constructed heretofore, in which a mechanism has been used for raising, lowering, and inverting a bowl including a bail; but the device herein described differs from these in many particulars.

Having now fully described my invention, what I claim, and desire to secure by Letters Patent, is—

The combination, with the scraper-bowl having the shaft $b$ and wheels $d$, with the bail $e$, pivoted arm $g$, rod $i$, arm $k$, and lug $n$, projecting from the tongue-brace $h$, substantially as and for the purpose specified.

NICHOLAS ENGELHART.

Witnesses:
M. L. MILLIGAN,
A. P. LATHROP.